Patented Mar. 8, 1949

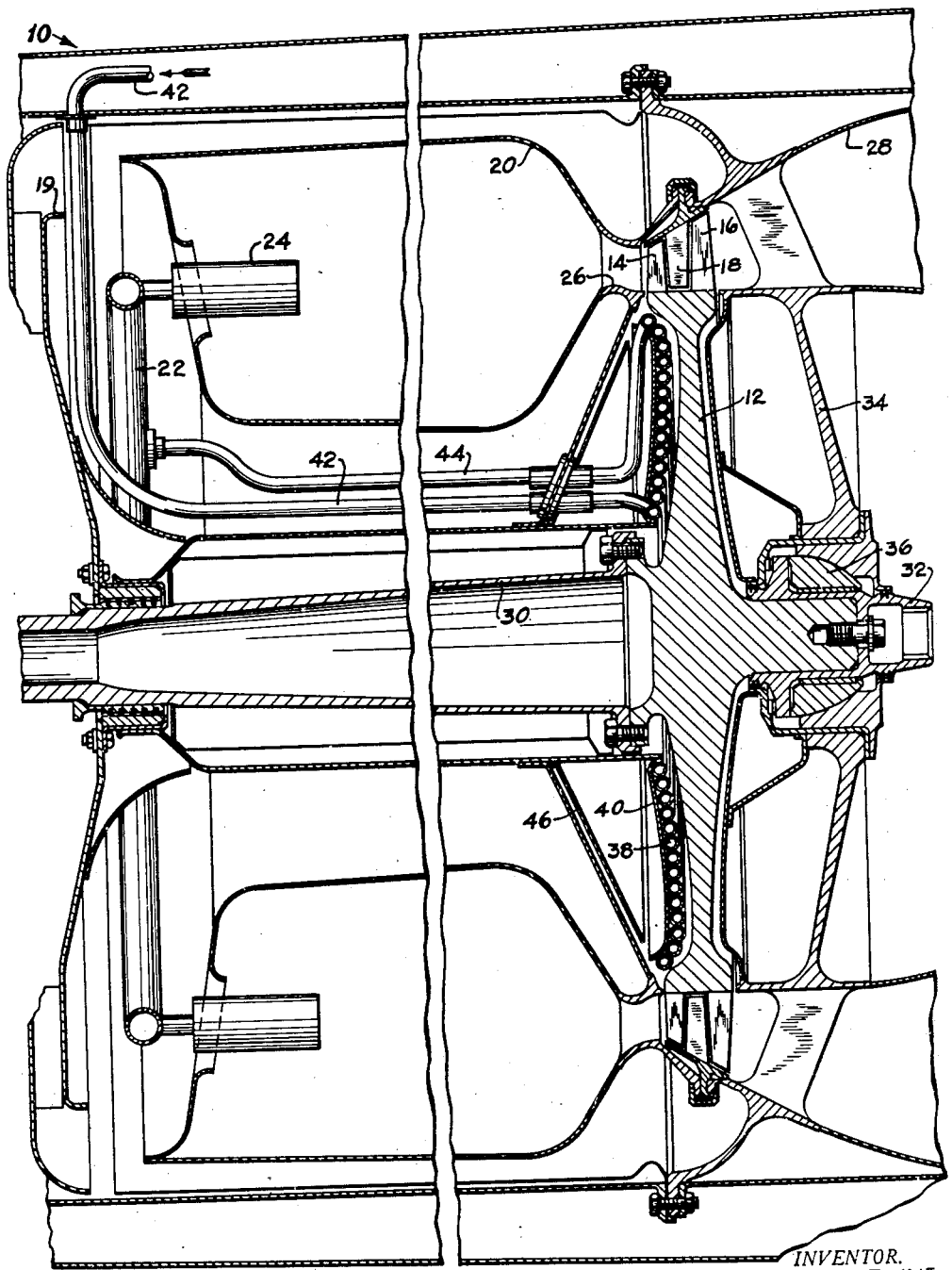

2,463,851

UNITED STATES PATENT OFFICE 2,463,851

TURBINE COOLING SYSTEM

Kenneth A. Browne, Ridgewood, N. J., assignor to Wright Aeronautical Corporation, a corporation of New York Application November 30, 1944, Serial No. 565,981

7 Claims. (Cl. 60—41)

This invention relates to turbines and is particularly directed to gas turbines and to the provision of a method and means for cooling a turbine rotor.

Gas turbine power plants are operated at as high a temperature as possible in order to obtain maximum turbine efficiency. Accordingly, one of the problems encountered in connection with the design and operation of gas turbines is the provision of some method or means for holding the temperature of the turbine rotor below a reasonable or safe operating temperature. It is an object of this invention to provide a novel method and means for cooling the turbine rotor. It is a further object of this invention to use the liquid fuel to be burned within the combustion chamber of the gas turbine for cooling the turbine rotor.

Specifically, the invention comprises a coil or series of coils through which the liquid fuel for the turbine is circulated prior to combustion, said coil or coils defining a stationary heat exchange surface disposed adjacent the high temperature side of the turbine rotor. With this construction, the turbine rotor is cooled by radiation of heat to the relatively cool fuel coils. In addition, the rotation of the turbine rotor causes a circulation or flow of air between the turbine rotor and the adjacent fuel coils, which air flow becomes quite turbulent because of the irregular surface presented by the fuel coils. This turbulent air flow between turbine rotor and the fuel coils helps to transfer heat from the turbine rotor to the fuel coils.

Other objects of this invention will become apparent from the annexed detailed description in connection with the drawing which comprises an axial section of a portion of a gas turbine power plant embodying the invention.

Referring to the drawing, a gas turbine power plant indicated in part at 10, comprises a turbine rotor or wheel 12 having one or more sets of turbine blades disposed about its periphery. As illustrated, the turbine rotor is provided with axially spaced sets of blades 14 and 16 about its periphery and a fixed set of blades 18 are disposed therebetween. Air for combustion is supplied through an annular passage 19, preferably by a compressor (not shown), to a combustion chamber 20 and liquid fuel is supplied to the combustion chamber 20 from an annular manifold 22 and a plurality of fuel nozzles 24.

From the combustion chamber, the combustion gases are directed against the turbine blades by an annular turbine nozzle 26 and this turbine motive fluid exhausts from the turbine blades and power plant through an annular duct 28. The turbine rotor 12 is provided with co-axial shafts 30 and 32 extending oppositely therefrom. The shaft 32 is journaled within a supporting web 34 and a thrust bearing 36 is provided for taking the axial thrust on the turbine rotor 12 resulting from the pressure differential of the turbine motive fluid thereacross. The shaft 32 may provide a drive for various auxiliary equipment of the power plant and a shaft 30 may drive the aforementioned compressor and, in the case of an aircraft engine installation, the shaft 30 may also drive an aircraft propeller. The structure so far described forms no part of the present invention and, for a more complete description, attention is directed to the co-pending application of W. G. Lundquist, Serial No. 565,019, filed November 24, 1944, which describes a somewhat similar aircraft gas turbine power plant.

The efficiency of a gas turbine in general increases with increase in temperature of the turbine motive fluid. Therefore, it is desirable to operate a turbine at as high temperature as possible. However, the temperature of the turbine rotor increases with increase in temperature of the turbine motive fluid, thereby limiting the maximum turbine operating temperature. Accordingly, means are provided to cool the turbine rotor in order to maintain its temperature within safe limits. To this end, a spiral coil or tubing 38 is disposed adjacent the upstream or high temperature end of the turbine rotor or wheel 12. This spiral tubing is supported by an annular backing plate 40 disposed substantially parallel to the adjacent surface of the turbine rotor. A liquid fuel supply conduit 42 is connected to one end of the spiral coil or tubing 38 and the other end of this coil or tubing is connected to the annular fuel distributing manifold 22 by a conduit 44. The spiral tubing or coil 38 is shielded from the heat of the combustion chamber 20 by conical shaped baffle means 46.

With this construction, the turbine rotor radiates heat to the relatively cool fuel within the coil or tubing 38. Also, the rotation of the turbine rotor causes considerable circulation and flow of air between the turbine rotor and adjacent fuel coil 38 and, since the coil 38 presents a fairly irregular surface, this air flow will be quite turbulent. Therefore, the air between the turbine rotor and the fuel coil or tubing 38 will also transfer a substantial amount of heat from the turbine rotor to the fuel. In this way, considerable heat is transferred from the turbine rotor to the fuel in the coil 38 thereby appreciably reducing the temperature of the rotor. In addition, the heat added to the liquid fuel in coil 38 will help atomize the fuel as it discharges from the fuel nozzles 24 into the combustion chamber 20.

As illustrated, the fuel supply conduit 42 is connected to the radially inner end of the spiral coil or tubing 38 and the conduit 44 is connected to the outer end of the spiral coil. Accordingly, fuel is supplied to a point adjacent the hub of the turbine rotor and as the fuel flows outwardly through the spiral it progressively increases in temperature because of the heat transferred from the turbine rotor. However if the temperature of the rim of the turbine rotor is critical then the fuel supply conduit 42 could be connected to the outer end of the spiral coil or tubing 38 to provide more cooling at the rim of the turbine rotor and less cooling at the rotor hub.

At this point, it should be noted that, although the coil or tubing 38 has been described as having a spiral configuration, the invention obviously is not limited to this specific structure. Thus, the coil or tubing 38 may have any desired configuration, in fact any hollow disc-like or other suitable heat exchange structure providing a jacket for the fuel flow therethrough may be disposed adjacent the turbine rotor 12 in place of the spiral coil or tubing 38.

Preferably, all the liquid fuel burned in the turbine combustion chamber passes through the coil 38 but it is obviously within the scope of this invention to pass only a portion of the fuel consumed through this coil.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A gas turbine power plant comprising a turbine rotor having a plurality of turbine blades about its periphery, said rotor having an annular end surface adjacent the upstream end of said blades, passage means through which liquid fuel is arranged to flow to said combustion chamber, said passage means including a disc-like coil structure serially connected therewith and disposed adjacent to and in heat exchange relation with said annular rotor surface, and means for shielding said coil structure from the heat of said combustion chamber.

2. In a gas turbine power plant comprising a turbine rotor having a plurality of turbine blades about its periphery, a combustion chamber for supplying motive fluid to said rotor blades, said rotor having an annular end surface adjacent the upstream end of said blades, fuel passage means through which liquid is arranged to flow to said combustion chamber, said passage means including an annular hollow disc-like structure disposed adjacent to and in heat exchange relation with said annular rotor surface.

3. A gas turbine power plant comprising a turbine rotor, a combustion chamber for supplying motive fluid to said rotor, and passage means through which liquid fuel is arranged to flow to said combustion chamber, said passage means including a disc-like coil structure serially connected therewith and disposed adjacent to and in heat exchange relation with said turbine rotor.

4. A gas turbine power plant comprising a turbine rotor having a plurality of turbine blades about its periphery; said rotor having an annular surface adjacent the upstream end of said blades and co-axial with said rotor; a combustion chamber for supplying combustion gases to said blades for rotating said rotor relative to said combustion chamber; and an annular heat exchange structure relative to which said rotor rotates and through which liquid fuel is arranged to flow to said combustion chamber in heat exchange relation with said annular rotor surface, said heat exchange structure being co-axial with said annular rotor surface and being separated therefrom by only an annular air space.

5. A gas turbine power plant comprising a turbine rotor having a plurality of turbine blades about its periphery; said rotor having an annular surface adjacent the upstream end of said blades and co-axial with said rotor; a combustion chamber for supplying combustion gases to said blades for rotating said rotor relative to said combustion chamber; and an annular heat exchange structure relative to which said rotor rotates and through which liquid fuel is arranged to flow to said combustion chamber in heat exchange relation with said annular rotor surface, said heat exchange structure being co-axial with said annular rotor surface and being exposed to radiant heat energy emanating from said rotor surface.

6. A gas turbine power plant comprising a turbine rotor having a plurality of turbine blades about its periphery, said rotor having an annular surface adjacent the upstream end of said blades and co-axial with said rotor; a combustion chamber for supplying combustion gases to said blades for rotating said rotor relative to said combustion chamber; and an annular heat exchange structure relative to which said rotor rotates and through which liquid fuel is arranged to flow to said combustion chamber in heat exchange relation with said annular rotor surface, said heat exchange structure being co-axial with said annular rotor surface and being separated therefrom by only an annular air space, the surface of said heat exchange structure adjacent said annular rotor surface being irregular whereby the air in said space becomes turbulent during turbine operation.

7. A gas turbine power plant comprising a turbine rotor having a plurality of turbine blades about its periphery; said rotor having an annular surface thereon co-axial with said rotor; a combustion chamber fixed relative to said rotor for supplying combustion gases to said blades for rotating said rotor relative to said combustion chamber; an annular heat exchange structure relative to which said rotor rotates and through which liquid fuel is arranged to flow to said combustion chamber in heat exchange relation with said annular rotor surface, said heat exchange structure being co-axial with said rotor surface and being exposed to radiant heat energy emanating from said rotor surface; and means for shielding said heat exchange structure from the heat of said combustion chamber.

KENNETH A. BROWNE.

REFERENCES CITED

The following references are of record in the file of this patent:

UNITED STATES PATENTS

| Number | Name | Date |
|---|---|---|
| 1,021,521 | Héroult | Mar. 26, 1912 |
| 1,163,956 | Schuh | Dec. 14, 1915 |
| 1,291,273 | Tyler | Jan. 14, 1919 |
| 2,413,225 | Griffith | Dec. 24, 1946 |

FOREIGN PATENTS

| Number | Country | Date |
|---|---|---|
| 275,677 | Great Britain | Mar. 22, 1928 |